Dec. 4, 1928.
D. M. KING
ICE SAW
Filed May 21, 1927
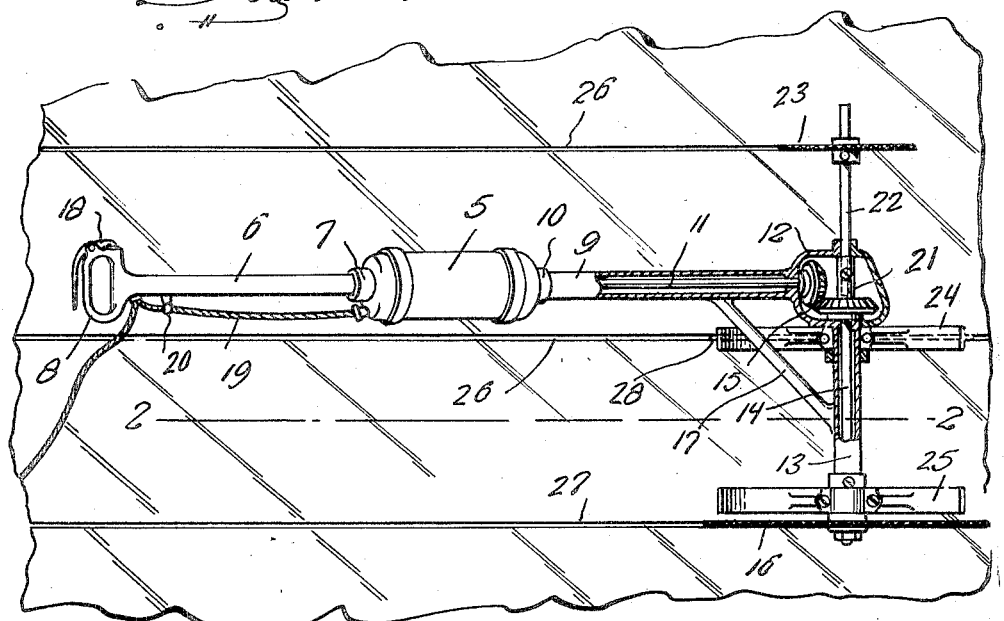
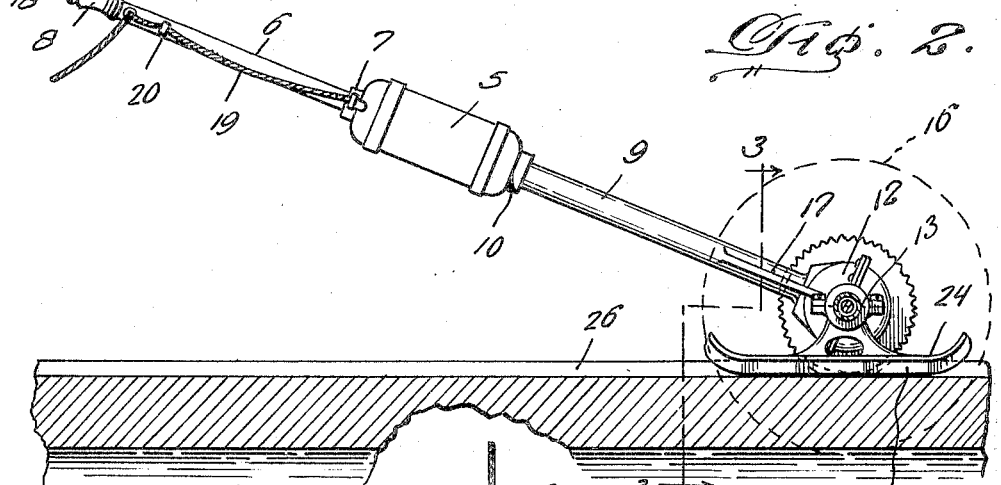
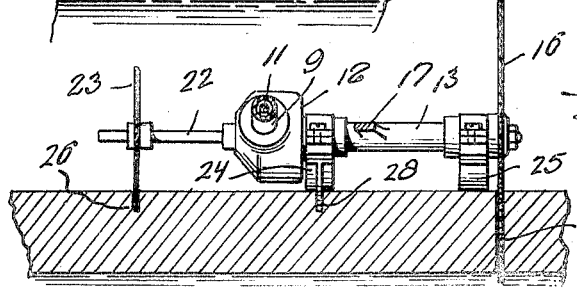
INVENTOR.
D. M. King,
BY
Stanley Burch
ATTORNEY.

Patented Dec. 4, 1928.

1,694,221

UNITED STATES PATENT OFFICE.

DEE M. KING, OF CANTON, TEXAS.

ICE SAW.

Application filed May 21, 1927. Serial No. 193,164.

This invention relates to improvements in ice saws, and has more particular reference to a portable sawing implement particularly adapted for use in dividing a body of ice into blocks or sections of desired sizes.

The primary object of the invention is to provide a generally simplified and improved ice sawing implement of that type adapted to rest upon and be pushed over the surface of the body of ice being divided.

A further object is to provide an ice sawing implement of the above kind which is effective in operation, durable in construction and capable of being cheaply and easily manufactured.

A more specific object is to provide an implement of the above kind which may be employed to advantage in dividing blocks of natural or manufactured ice into small pieces suitable for use in domestic refrigerators, and which may be readily provided with suitable attachments for adapting the same for most efficient use in the harvesting of natural ice.

Still another object is to provide a sawing implement of the above kind with simple and efficient means for guiding the same when harvesting ice so as to saw the ice into strips of uniform width.

A still further object is to effect the guiding of the implement by means involving the initial partial severing of the ice along one line to form a guide groove therein while completing the severing of the ice along a parallel line where a guide groove has been previously formed, thus greatly facilitating the sawing operation and enabling the implement to be easily moved in a straight path with the expenditure of a minimum amount of effort or manual labor.

Other objects will become apparent as the nature of the invention is better understood, and the same consists in the novel form, combination and arrangement of parts hereinafter more fully described, shown in the accompanying drawing and claimed.

In the drawing, wherein like reference characters indicate corresponding parts throughout the several views:

Figure 1 is a view, partly in top plan and partly in section, showing an ice sawing implement constructed in accordance with the present invention applied to use in ice harvesting.

Figure 2 is a section on line 2—2 of Figure 1, and

Figure 3 is a section on line 3—3 of Figure 2.

Referring more in detail to the drawing, the present ice sawing implement embodies a staff composed of a small rotary electric motor 5, a handle having an elongated shank 6 attached at its lower end, as at 7, to the upper end of the casing of motor 5 and formed at its upper end with a suitable hand hold or grip 8, and a tubular shaft housing 9 having its upper end attached, as at 10, to the lower end of the motor casing.

The motor 5 is of a conventional type having a rotary armature to which is fixed a drive shaft 11 that is journaled in the housing 9 and projects into a gear casing 12 rigidly attached to the lower end of said housing 9. Fixed to and projecting laterally from one side of the gear casing 12 is a further tubular shaft housing 13 in which is journaled a driven shaft 14 whose inner end projects into the gear casing 12 and has constant operative connection with the adjacent lower end of the drive shaft 11 by means of a bevel gearing 15 within said gear casing. The outer end of the driven shaft 14 projects beyond the outer end of shaft housing 13 and has a circular saw 16 secured thereon, said saw being of sufficient diameter to cut entirely through the ice. A diagonal brace 17 extends between the two shaft housings to relieve the housing 13 of rearward bending strains, and the hand hold 8 is equipped with a suitable switch, as indicated at 18, preferably of the hand-grip type, to throw the motor 5 into and out of operation. The current is fed to the motor from a suitable source through an attachment cord 19 that extends from the switch, through a suitable guide 20 on the handle shank 6, to the motor.

The implement as thus far described is suitable for use in dividing blocks of ice into small pieces for use in domestic refrigerators, and when so used, the saw 16 is engaged with the top of the block of ice near one side and the hand hold 8 is gripped so as to operate the switch 18, thereby throwing the motor into operation and causing the saw to be rotated through the gearing described. As soon as the saw cuts its way entirely through the block of ice at this point, the implement is pushed forwardly so as to cut entirely through the block of ice to the opposite side, the weight of the implement being sustained by the gear casing resting and sliding on top of the block of ice.

The gear on the inner end of the driven shaft 14 has an axial socket member 21 registered with an opening in the side of the gear casing 12 opposite that from which the shaft housing 13 projects, and removably secured in the socket member 21 is the inner end of a shaft section 22 that projects through said gear casing opening and has a relatively small circular saw 23 secured on its outer end. Pivotally and detachably mounted on the ends of the lateral shaft housing 13 are a pair of spaced runners 24 and 25, adapted to facilitate the movement of the implement over the surface of the ice and to guard against lateral tilting of the implement during ice harvesting operations, while at the same time freely permitting positioning of the staff at any desired inclination without raising or lowering the saws relative to the ice. The space between the main saw 16 and the inner runner 24 is the same as that between the latter and the smaller auxiliary saw 23, and the latter saw is of such size or diameter as to only cut partially through the ice to form a guide groove, as at 26, in the same, while the main saw 16 is cutting entirely through the ice along a parallel line, as at 27. The runner 24 has a longitudinal guide rib 28 on the under side thereof adapted to engage in a pre-formed guide groove 26, thereby, effectively guiding the implement while the new guide groove is being formed by the saw 23 at one side of said pre-formed guide groove and the severing of the ice is being completed by the saw 16 along a line defined by another previously formed groove at the other side of said pre-formed guide groove. Thus, at the end of a cut, the implement will be lifted and shifted laterally to engage the saw 16 in the guide groove which, in the said cut, was engaged by the rib 28, and to engage the said rib in the new guide groove which was made during said cut. The staff is then swung to the opposite side of the saws, and the implement is pushed in the opposite direction to complete a new cut and form the next guide groove. It will, of course, be understood that the motor will drive both saws, in this use of the device.

From the foregoing description, the construction and operation, as well as the advantages of the present invention, will be readily understood and appreciated by those skilled in the art.

Minor changes may be made without departing from the spirit and scope of the invention as claimed.

What I claim as new is:

1. An ice sawing implement including a motor having a casing, a handle having a shank attached to one end of said motor casing, a tubular shaft housing attached at one end to the other end of said motor casing, a gear casing attached to the other end of the shaft housing, a drive shaft for the motor journaled in said housing and projecting into said gear casing, a further tubular shaft housing attached at one end to and extending laterally from one side of said gear casing, a driven shaft journaled in said further shaft housing and projecting into said gear casing, gearing operatively connecting adjacent ends of the shafts within said gear casing, a circular saw fixed on the outer end of the said driven shaft, and a diagonal brace between said shaft housings.

2. An ice sawing implement including a motor having a casing, a handle having a shank attached to one end of said motor casing, a tubular shaft housing attached at one end to the other end of said motor casing, a gear casing attached to the other end of the shaft housing, a drive shaft for the motor journaled in said housing and projecting into said gear casing, a further tubular shaft housing attached at one end to and extending laterally from one side of said gear casing, a driven shaft journaled in said further shaft housing and projecting into said gear casing, gearing operatively connecting adjacent ends of the shafts within said gear casing, a circular saw fixed on the outer end of said driven shaft and runners pivotally mounted on the ends of said further shaft housing.

3. In an ice harvesting sawing implement, a frame provided with a supporting runner and having a handle to facilitate pushing of the implement over the surface of the ice, and means carried by the frame including a pair of spaced circular saws of different diameters for simultaneously cutting entirely through the ice and cutting partly through the ice along spaced lines parallel with the line of travel of the implement, said runner being mid-way between the saws and having a depending central guide rib.

4. In an ice harvesting sawing implement, a frame provided with spaced supporting runners and having a handle to facilitate pushing of the implement over the surface of the ice, and means carried by the frame including a pair of spaced circular saws of different diameters for simultaneously cutting through the ice and cutting partly through the ice along spaced lines parallel with the line of travel of the implement, one of said runners being mid-way between the saws and having a depending longitudinal guide rib arranged to engage in a pre-formed groove, made by cutting partly through the ice, while a through cut is being made along another similar groove at one side of said pre-formed groove and a new groove is being made at the other side of said pre-formed groove.

5. In an ice harvesting implement, a frame having a handle and provided with a transverse driven shaft, a pair of spaced circular saws secured on said shaft and being of such different diameters as to respectively cut entirely through and partly through the ice, and a supporting runner for the frame arranged mid-way between the saws and having a depending longitudinal guide rib located midway between the saws and adapted to ride in a groove previously formed by one of the saws in cutting partly through the ice.

6. An ice sawing implement including a motor having a casing, a handle having a shank attached to one end of said motor casing, a tubular shaft housing attached at one end to the other end of said motor casing, a gear casing attached to the other end of the shaft housing, a drive shaft for the motor journaled in said housing and projecting into said gear casing a further tubular shaft housing attached at one end to and extending laterally from one side of said gear casing, a driven shaft journaled in said further shaft housing and projecting into said gear casing, gearing operatively connecting adjacent ends of the shafts within said gear casing, a circular saw fixed on the outer end of the said driven shaft, and a diagonal brace between said shaft housings, and a removable shaft section carried by the driven shaft and having a smaller circular saw secured thereon to cut partly through the ice.

7. An ice sawing implement including a motor having a casing, a handle having a shank attached to one end of said motor casing, a tubular shaft housing attached at one end to the other end of said motor casing, a gear casing attached to the other end of the shaft housing, a drive shaft for the motor journaled in said housing and projecting into said gear casing, a further tubular shaft housing attached at one end to and extending laterally from one side of said gear casing, a driven shaft journaled in said further shaft housing and projecting into said gear casing, gearing operatively connecting adjacent ends of the shafts within said gear casing, a circular saw fixed on the outer end of said driven shaft, a diagonal brace between said shaft housings, a removable shaft section carried by the driven shaft and having a smaller circular saw secured thereon to cut partly through the ice, and a runner pivoted on the further shaft housing mid-way between the saws and having a depending central longitudinal guide rib.

In testimony whereof I affix my signature.

DEE M. KING.